(12) United States Patent
Weston et al.

(10) Patent No.: US 6,515,992 B1
(45) Date of Patent: Feb. 4, 2003

(54) METHOD AND APPARATUS FOR INPUT OF DATA

(75) Inventors: David Robert Weston, Oxfordshire (GB); Andrew James Copper, Boulder, CO (US); Andrew Johnson, Surrey (GB); Anthony Stephen Walton, Surrey (GB); David Alan Woodfield, Walsall (GB)

(73) Assignee: Two Way TV Limited, London (GB)

( * ) Notice: Subject to any disclaimer, the term of this patent is extended or adjusted under 35 U.S.C. 154(b) by 0 days.

(21) Appl. No.: 09/203,458

(22) Filed: Dec. 2, 1998

(30) Foreign Application Priority Data

Dec. 2, 1997 (EP) .............................. 97309664

(51) Int. Cl.7 ............................................. H04L 12/56
(52) U.S. Cl. ...................... 370/394; 370/349; 370/350; 370/503; 463/39
(58) Field of Search ................................ 370/297, 315, 370/319, 321, 324, 349, 350, 389, 503, 394; 463/5, 36, 37, 38, 39

(56) References Cited

U.S. PATENT DOCUMENTS

| | | | | |
|---|---|---|---|---|
| 4,477,809 A | * | 10/1984 | Bose | ................... 340/825.54 |
| 4,894,823 A | * | 1/1990 | Adelmann et al. | ........... 370/252 |
| 4,924,216 A | * | 5/1990 | Leung | ......................... 340/709 |
| 5,098,110 A | | 3/1992 | Yang | |
| 5,150,114 A | * | 9/1992 | Johansson | ............... 340/825.54 |
| 5,561,419 A | | 10/1996 | Sasaki et al. | |
| 6,288,739 B1 | * | 9/2001 | Hales et al. | .............. 348/14.07 |

FOREIGN PATENT DOCUMENTS

| | | |
|---|---|---|
| EP | 0538745 | 4/1993 |
| EP | 0649102 | 4/1995 |
| WO | 9625989 | 8/1996 |

* cited by examiner

Primary Examiner—Hassan Kizou
Assistant Examiner—Tim Spafford
(74) Attorney, Agent, or Firm—Snell & Wilmer, LLP

(57) ABSTRACT

A method of inputting one or more items of information to a data destination (21). The method comprises generating the item(s) of information at one or more data sources (25–28); and for each item of information transmitting the item of information to the data destination in a data packet; calculating a time stamp value in accordance with the time delay between generating the item of information and transmitting the data packet; encoding the time stamp value in the data packet; decoding the data packet at the data destination to retrieve the time stamp value; and calculating the time delay associated with the data packet in accordance with the retrieved time stamp value.

9 Claims, 5 Drawing Sheets

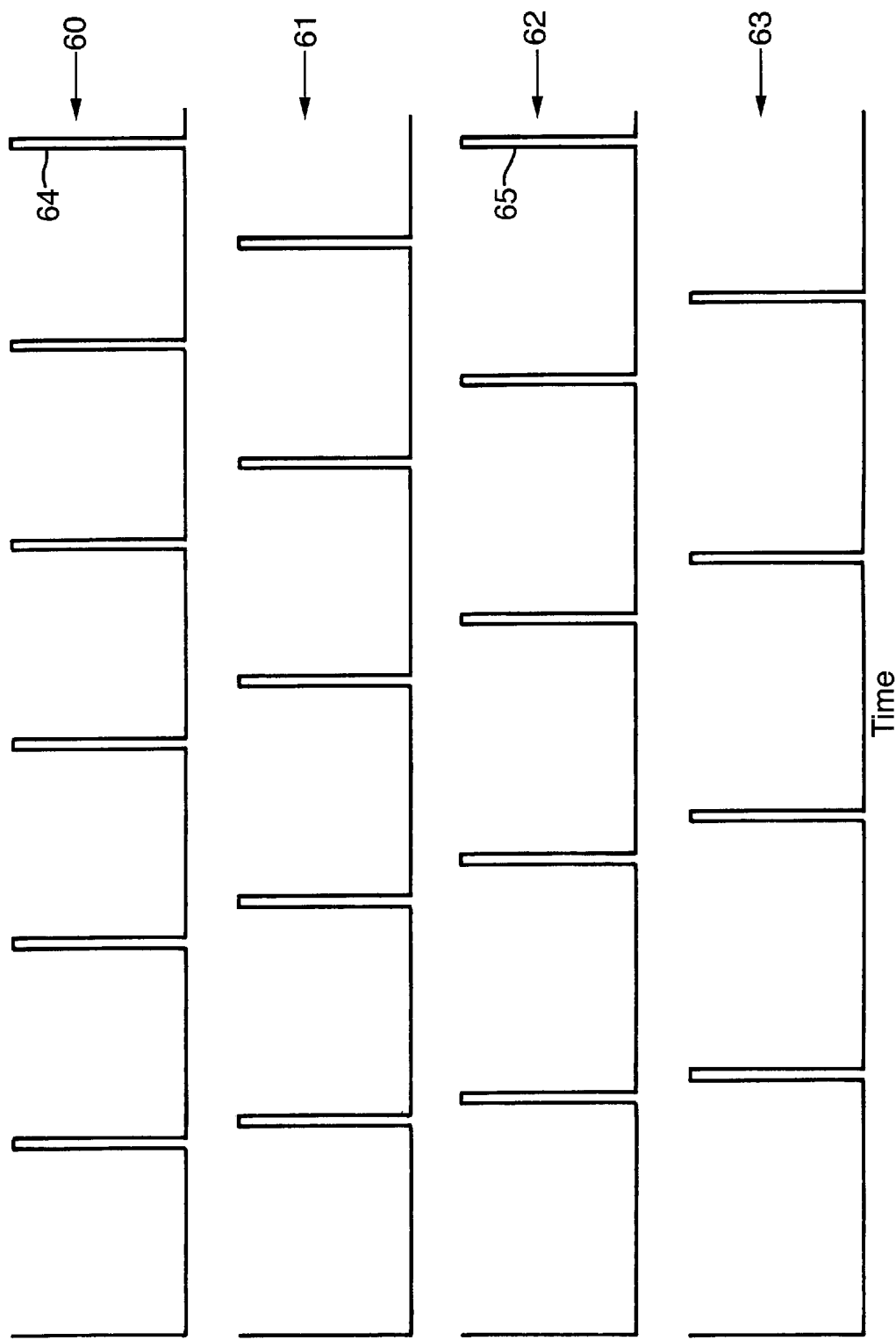

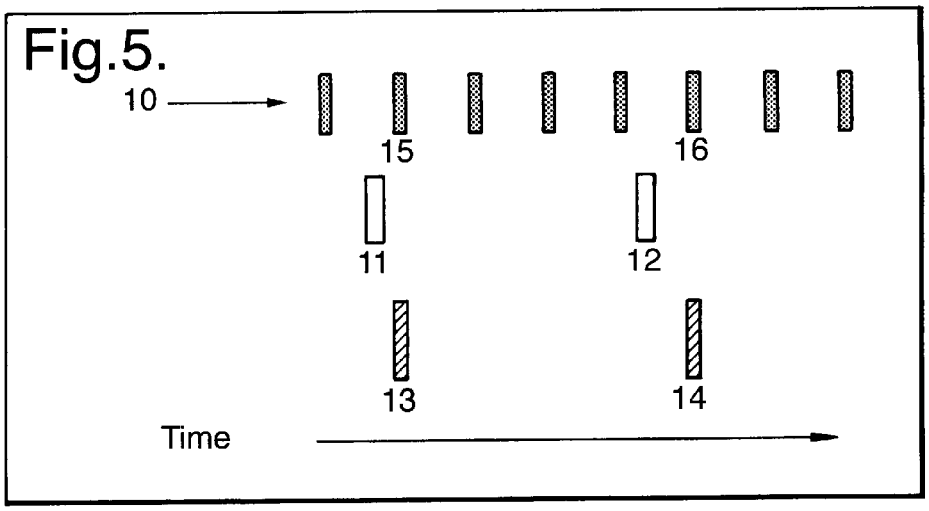
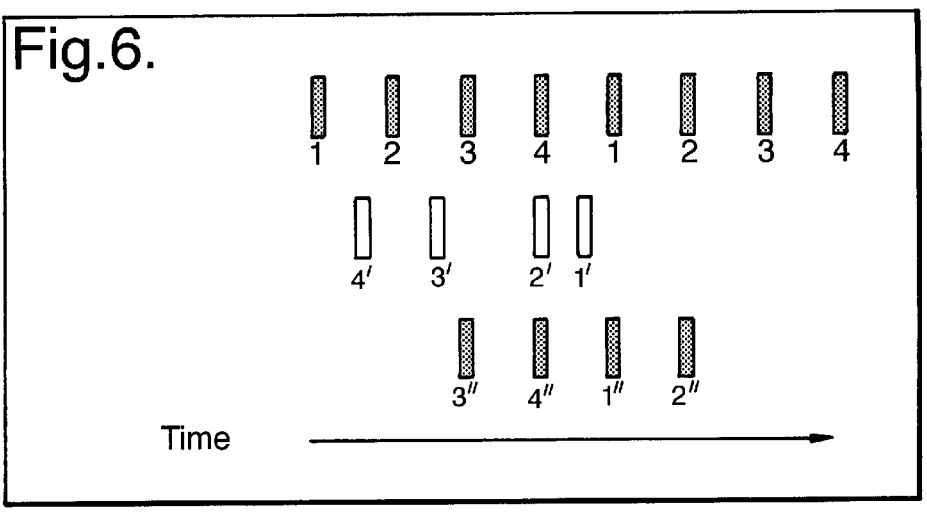
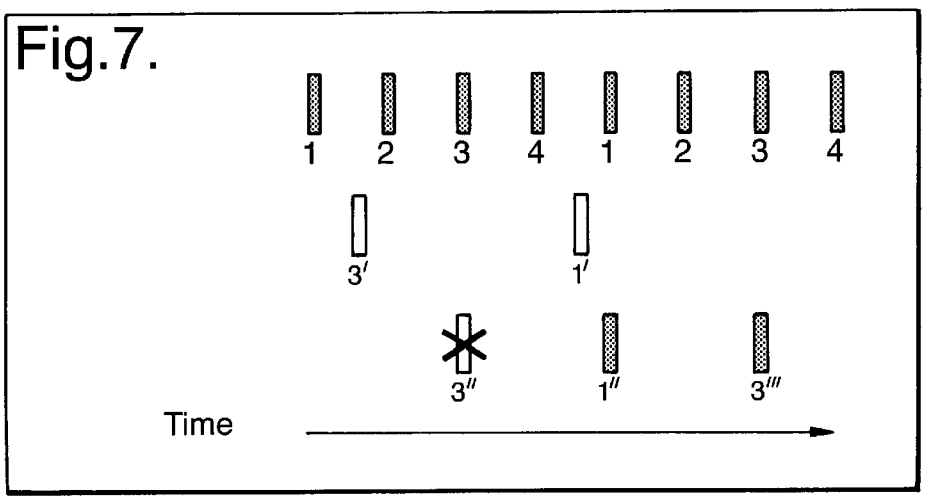

METHOD AND APPARATUS FOR INPUT OF DATA

FIELD OF THE INVENTION

The present invention relates to a method and apparatus for inputting data to a data destination. In particular the present invention relates to a system in which an item of information is generated at a data source and transmitted to the data destination in a data packet.

DESCRIPTION OF THE PRIOR ART

An example of a system of this type is an interactive home entertainment games console. A player presses buttons on a handset, causing the handset to generate game-play data which is transmitted to a central game controller. Some data transmission protocols make it impossible to transmit the data at the time the button is pressed, and as a result the central game controller is unable to determine exactly when a button has been pressed. For example, referring to FIG. 5, a handset is configured to transmit data packets during a series of equally spaced time slots 10. A player presses a button at 11 and 12. However the game-play data is only transmitted to the game controller at 13 and 14 during the next time slots 15, 16. The exact time when the button was pressed can be very important, for instance in a single player game to determine whether the player has hit a moving target.

One way to avoid the problems discussed above is to have a synchronised real-time clock in the handset, to register the exact time that a button was pressed and to include this information as an absolute time stamp in the data packet. A problem with this approach is that synchronisation of the real-time clock adds computational complexity and also requires a two-way link between the game controller and the handset. This adds to the cost of components.

SUMMARY OF THE INVENTION

In accordance with a first aspect of the present invention there is provided a method of inputting one or more items of information to a data destination, the method comprising generating the item(s) of information at one or more data sources; and for each item of information transmitting the item of information to the data destination in a data packet; calculating a time stamp value in accordance with the time delay between generating the item of information and transmitting the data packet; encoding the time stamp value in the data packet; decoding the data packet at the data destination to retrieve the time stamp value; and calculating the time delay associated with the data packet in accordance with the retrieved time stamp value.

In contrast with the conventional approach the present invention generates a relative time stamp value which indicates the time delay between generating and transmitting the item(s) of information. As a result no synchronisation is needed between the data source and the data destination.

The retrieved time stamp value can then be used to calculate the exact time when the item of information was generated. Where a plurality of items of information are generated, their order of generation can be calculated from the time stamp values.

The problem of calculating the order of generation of items of information is particularly acute in a system with a plurality of data sources. Referring to FIG. 6, four synchronised handsets have time-division multiplexed transmission slots, ie. a first handset transmits during time slots 1; a second handset transmits during time slots 2; a third handset transmits during time slots 3; and a fourth handset transmits during time slots 4. Buttons on the first, second, third and fourth handsets are pressed at 1', 2', 3' and 4' respectively. However the message cannot be transmitted to the game controller until the time slot allocated to that handset occurs. Therefore the data packets from the first, second, third and fourth handsets are received at 1", 2", 3" and 4" respectively. It can be seen that the order of receipt (ie. 3", 4", 1", 2") is different from the order in which the buttons are pushed (ie. 4', 3', 2', 1'). This leads the game controller to make the wrong decision as to who pressed a button first, for instance in a tie-break situation.

Now referring to FIG. 7, in this case a button on the third handset is pressed at 3", and a button on the first handset is pressed later at 1'. However interference causes the first message 3" to be lost. The message is repeated at 3'" (ie. at the next available time slot) but is out of order with the message 1' from the first handset.

Therefore in a preferred embodiment a plurality of items of information are input to the data destination from a plurality of data sources. Typically the data packets from each data source are transmitted over a common data channel (e.g. a common infra-red link).

Typically each data packet is transmitted during a predetermined time slot. In one example, the data source is allocated a series of time slots, each successive time slot being spaced by a repetition period. If the repetition period is known and substantially constant, then this enables the resolution of the time stamp value to be chosen accordingly. In one example the resolution of the time stamp value is chosen to be half the repetition period.

The data packets may be transmitted in synchronised time slots (eg. of the type shown in FIG. 5). However preferably the method further comprises:

transmitting each item of information from each data source as a series of data packets, each data packet being separated from adjacent data packets transmitted by the same data source by a repetition period, the repetition period of each data source being different from the repetition periods of the other data sources; and repeatedly transmitting each item of information from the same data source in at least N adjacent data packets, where N is the number of data sources, in order to ensure that at least one of the N adjacent data packets is received at the data destination without overlapping with data packets from the other data sources.

This enables multiple unsynchronised data sources to transmit over a common data channel, significantly reducing the complexity, and hence cost, of the system. In general each data packet has a different time stamp value to the other at least N–1 adjacent data packets.

The method may be employed in any communication system in which time stamping is required. However in a preferred example the item(s) of data comprise(s) game-play data, the data source(s) comprise(s) one or more game-play input devices which generate the game-play data, and the data destination comprises a game-play controller.

In accordance with a second aspect of the present invention there is provided a system comprising a data destination having a receiver for receiving data; and one or more data sources each comprising means for generating an item of information, a transmitter for transmitting the item of information to the data destination, a processor for controlling the transmitter such that the transmitter transmits the item of information to the data destination in a data packet, means for calculating a time stamp value in accordance with the time delay between generating the item of information and transmitting the data packet, and an encoder for encoding the time stamp value in the data packet; wherein the data destination further comprises a decoder for decoding the data packet to retrieve the time stamp value; and means for calculating the time delay associated with the data packet in accordance with the retrieved time stamp value.

Typically the means for calculating a time stamp value comprises a time stamp counter which counts at a predetermined rate during the time delay to generate a count value. The predetermined rate can then be selected in accordance with the required resolution of the time stamp value.

The data source(s) may communicate with the data destination via a two-way link in order to provide synchronisation. However this creates additional expense. Therefore preferably the data destination is unable to transmit synchronisation information to the data source(s), and the data source(s) is/are unable to receive synchronisation information from the data destination. This enables much cheaper components to be used.

BRIEF DESCRIPTION OF THE DRAWINGS

An embodiment of the present invention will now be described and contrasted with the prior art with reference to the accompanying drawings, in which:

FIG. 4 illustrates the different time slot pulses generated by the four handsets;

FIG. 5 illustrate the problem of loss of time information in a single player game;

FIG. 6 illustrates the problem of loss of time information in a multiple player tie-break; and FIG. 7 illustrates the problem of loss of time information where a data packet is not received.

DETAILED DESCRIPTION OF THE EMBODIMENT

Figure 1:
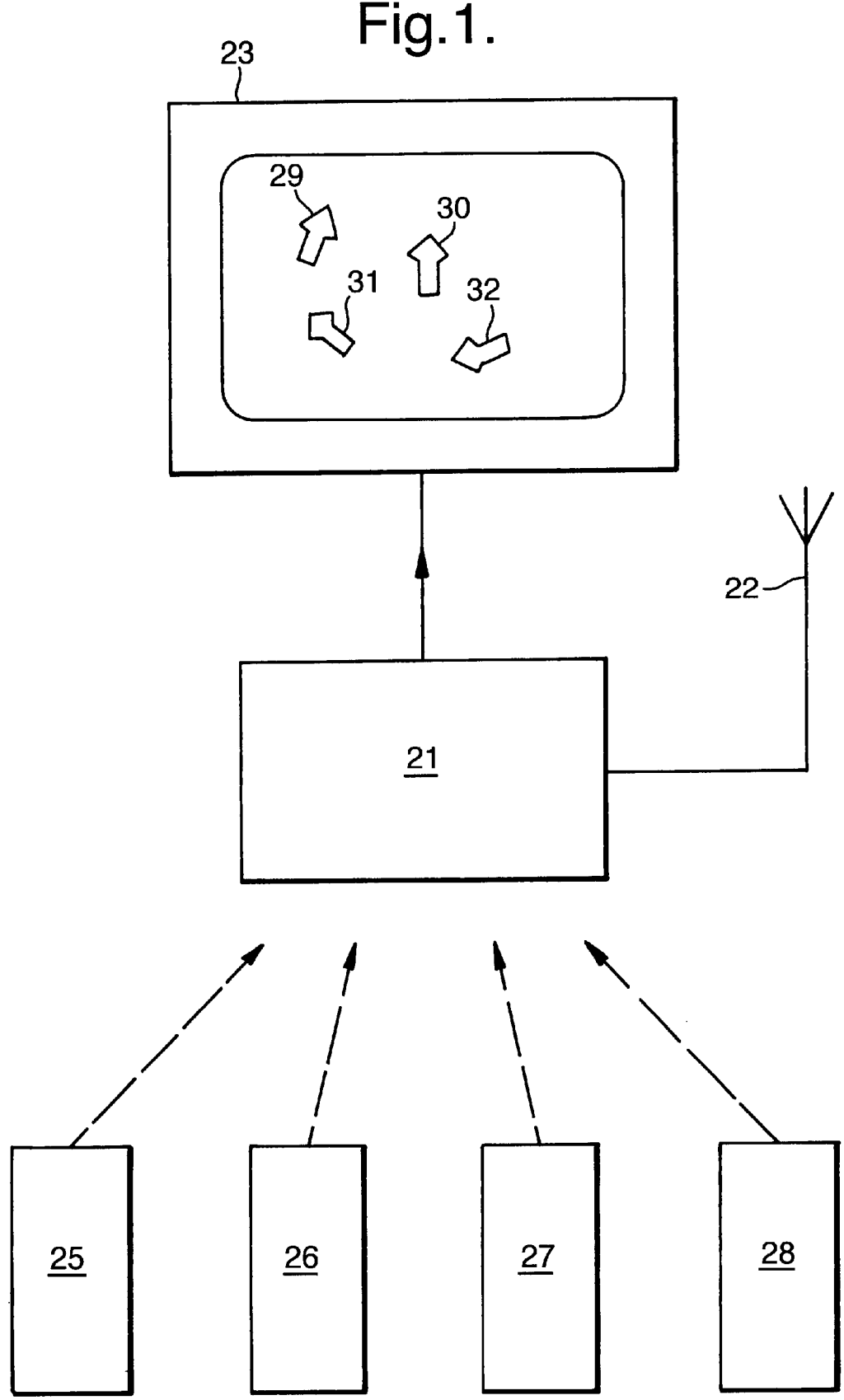
FIG. 1 is a schematic diagram of an interactive game playing system.

An example of the present invention when used in a game playing system is shown in FIG. 1. The system of FIG. 1 is part of an interactive game playing system of the type described in EP-A-0649102. The system comprises a game controller 21, a receiving aerial 22 for receiving broadcasts from a central TV transmitter (not shown) and a monitor 23, such as a conventional television set. Broadcast information and programmes from the central transmitter (not shown) are received by the aerial 22 and fed via the local controller 21 to the monitor 23 for display. For example, the broadcast could include a game programme which is displayed in a conventional manner.

Four remote handsets 25–28 are provided, each of which is operated by an individual player. The game controller 21 causes four cursors 29–32 to be displayed on the monitor 23, the position of each cursor being controlled by a respective one of the handsets 25–28.

Figure 2:
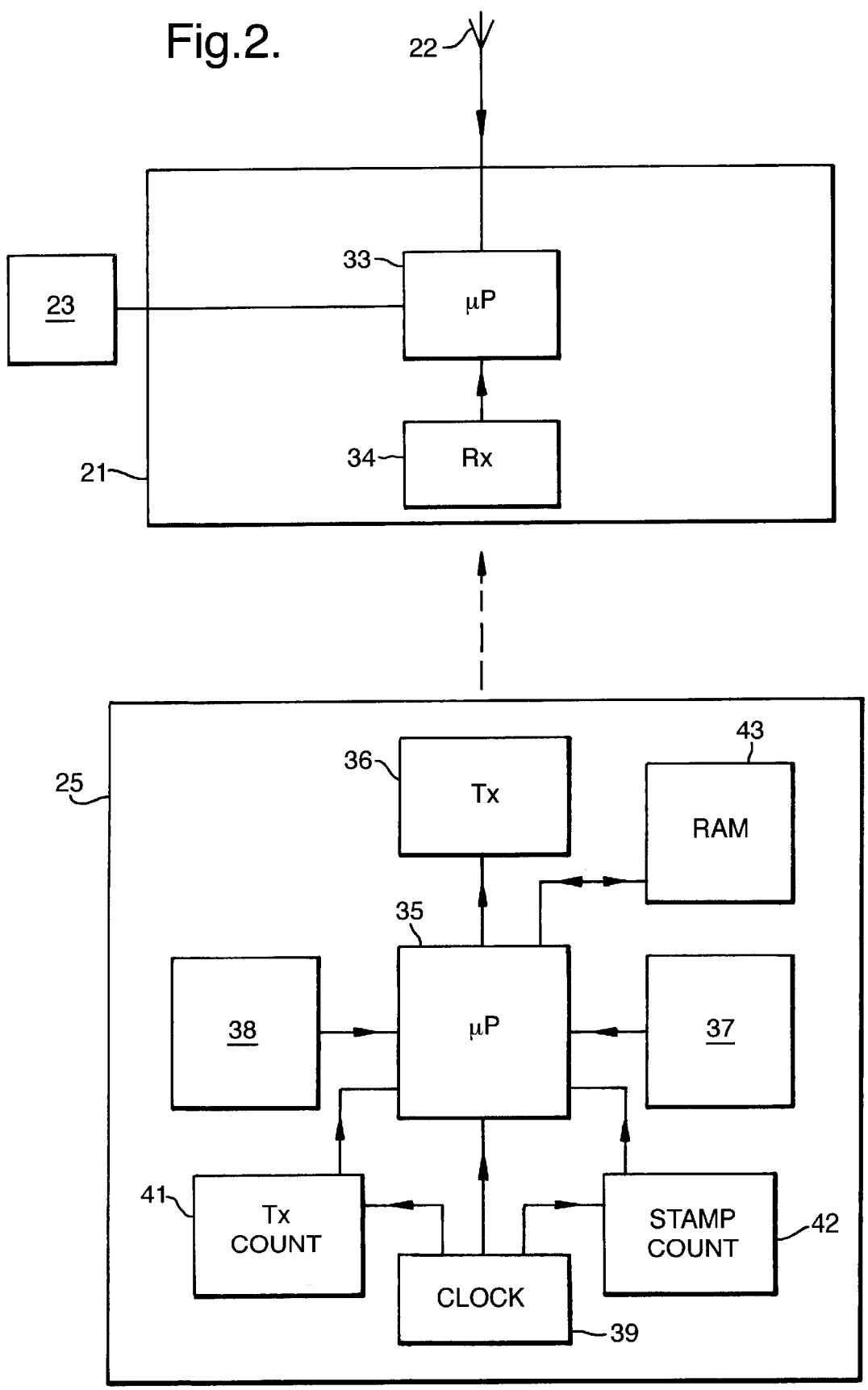
FIG. 2 shows the game controller and one handset in more detail.

The construction of the game controller 21 and one of the handsets 25 is shown in more detail in FIG. 2. The other handsets 26–28 are identical in construction. The aerial 22 is connected to a central 68000 microprocessor 33. The microprocessor 33 processes signals from the aerial 22 for display on the monitor 23. The game controller 21 also comprises an infra-red receiver 34, which receives infra-red signals from the four remote handsets 25–28.

The remote handsets 25–28 each comprise a central microprocessor 35 which controls an infra-red transmitter 36 as discussed below. The remote handsets each have a cursor control device 37 for controlling the position of a respective one of the cursors 29–32, and an array of buttons 38 which feed data to the microprocessor 35. An oscillator 39 (such as a quartz crystal or ceramic resonator) generates a 115200 Hz clock signal with an accuracy of approximately 1%. The clock signal is fed to the microprocessor 35, to a transmit time slot counter 41, and to a time stamp counter 42.

Figure 3:
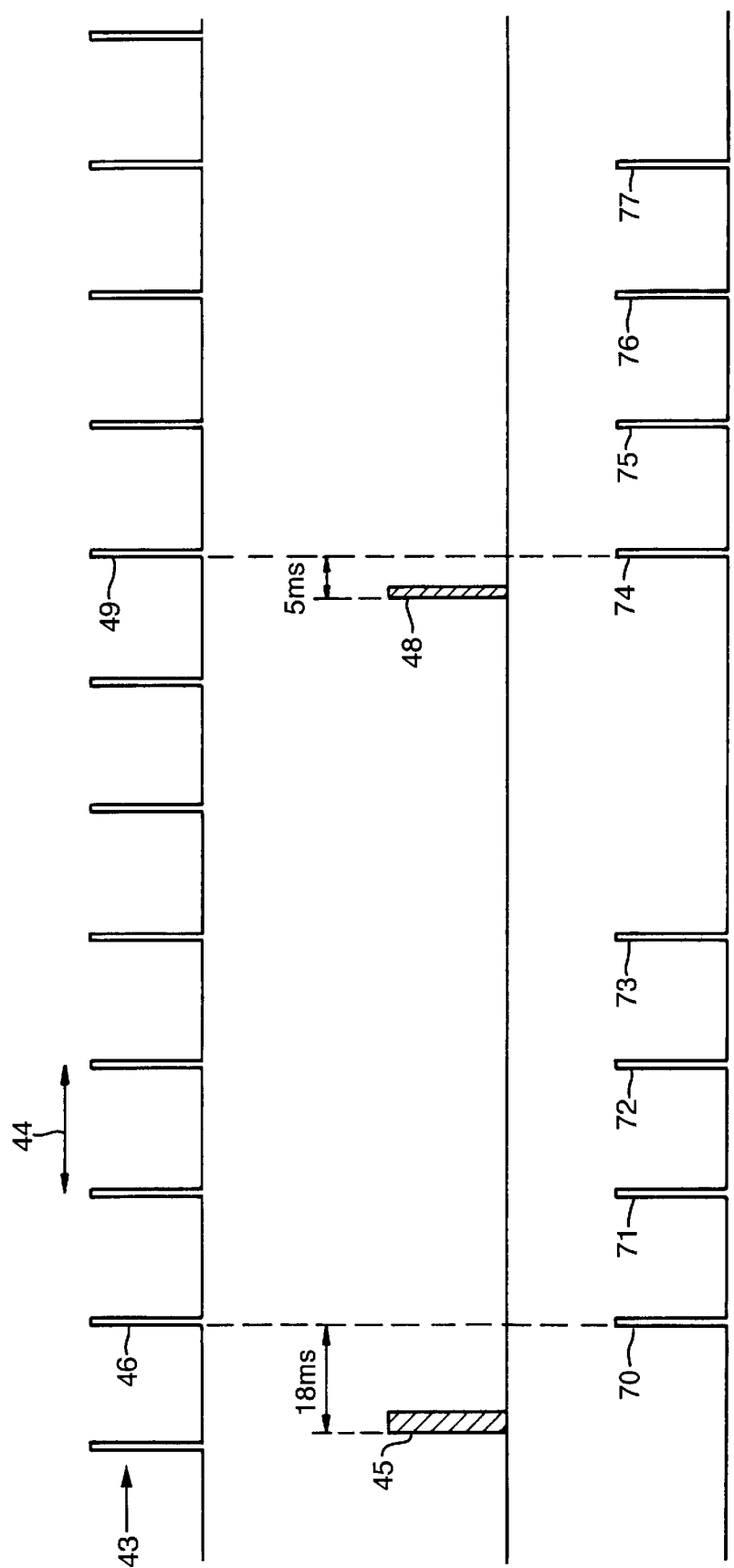
FIG. 3 illustrates the transmission of data packets from one of the handsets.

Referring to FIG. 3, the transmit time slot counter 41 cyclically counts for a selected number of clock cycles and generates a time slot pulse 43 once every cycle, with a repetition period 44 between successive time slot pulses 43. In the case of handset 25 the repetition period 44 is 20 ms. A button 38 is pressed and generates an item of information 45 which is stored in RAM 43. When the next time slot pulse 46 is received, the microprocessor 35 reads the stored information from RAM 43 and repeatedly transmits it in four successive data packets 70–73 via infra-red transmitter 36. The cursor control 37 subsequently generates an item of information at 48 which is stored in RAM 43. When the next time slot pulse 49 is received, the microprocessor 35 reads the stored information from RAM 43 and repeatedly transmits it in four successive data packets 74–77 via infra-red transmitter 36.

The time stamp counter 42 starts counting every time at item of information is generated by the buttons 38 or cursor control 37. The time stamp counter 42 increments twice every repetition period (ie. every 10 ms in the case of handset 25) and the present value of the time stamp counter 42 is added to each data packet. For instance in the example of FIG. 3, the button data 45 is generated 18 ms before the time slot pulse 46. Therefore the four data packets 70–73 are time stamped with time stamp values 1, 3, 5 and 7 respectively. In contrast the cursor control data 48 is generated only 5 ms before the time slot pulse 49. Therefore the four data packets 74–77 are time stamped with time stamp values 0, 2, 4 and 6 respectively.

Each data packet carries 80 bits which are transmitted at a bit rate of 115200 Hz over a data packet length of 0.69 ms. Each data packet comprises an identifier to identify which handset 25–28 has generated the data packet, a data field and a check field. The data field is encoded to contain the information stored in RAM 23, along with a time stamp value from counter 42.

Referring to FIG. 4, the transmit time slot counters 41 of the four handsets 25–28 are each programmed to generate time slot pulses at different repetition rates. The first handset 5 has a transmit time slot counter 41 which counts 2304 clock cycles and generates a time slot pulse 60 every 20 ms. In contrast, the transmit time slot counter in the second handset 6 counts 2534 clock cycles and generates a time slot pulse 61 every 22 ms. The third and fourth handsets 7,8 generate time slot pulses 62, 63 with repetition periods of 24 ms and 26 ms respectively.

Because the time slot pulses 60–63 are not synchronised, their timing relationship will drift. Rather than try to synchronise the handsets, their repetition periods are deliberately set to be slightly different so that their relative phases are constantly changing. This will occasionally cause overlap as two handsets send two data packets at once. For instance, in FIG. 4 time slot pulse 64 from handset 5 overlaps with time slot pulse 65 from handset 7. When this happens, any data packets sent in response to the time slot pulses 64, 65 will be corrupted. So as to avoid loss of data, each item of information is repeated four times by each handset.

The game controller microprocessor 33 decodes each data packet as it arrives, and sends display signals to the monitor 23 in response to the information carried by the data packet. The microprocessor 33 knows the repetition period of each handset. When it receives a data packet it checks the time stamp value and calculates the time delay. For example, referring to FIG. 3, the first data packet 70 has a time stamp value of 1. Therefore the microprocessor 33 knows that the button data 45 was generated 10–20 ms before the data packet 70 was transmitted. The microprocessor 33 also accounts for any delays in receiving and processing the data packets. If the first data packet 70 overlaps with another data packet, or is lost due to other interference, then the microprocessor can simply decode the next data packet 71 to retrieve the same information. In this case the time stamp value is 3, indicating that the button data 45 was generated 30–40 ms before the data packet 71 was transmitted. By calculating the actual time that the buttons 38 were pressed, rather than the time that the data packets are received, the microprocessor 33 can make correct decisions in time critical action games, and can also calculate the correct order that buttons were pressed across all four handsets.

By carefully selecting the data packet lengths and repetition periods as discussed below, clear reception of at least one copy of each item of information can be guaranteed whilst the data rate of each handset is maximised.

In this example the difference in repetition period between each handset is chosen to be equal. Therefore the repetition period of each handset is given as follows:

Period $n$=Period 1+$(n-1)$ Delta where "Period n" is the repetition period of the nth handset, and "Delta" is the difference in repetition period.
Therefore Period 2=Period 1+Delta Period 3=Period 2+Delta Period 4=Period 3+Delta Delta must be great enough so that if any overlap occurs it will not occur between the same two handsets on the next data packet. The infra-red receiver 14 will also have a characteristic recovery time. In addition the oscillator 39 may drift causing a change in bit rate. This results in the following constraint:

Delta $\geq 2*$(burst length), where burst length=data packet length+recovery time+bit rate accuracy.

In the example given above, the data packet length is determined by the bit rate (115200 Hz) and number of bits per data packet (80) as 80/115200=0.694 ms. A typical value of the recovery time is 0.3 ms. Typically the bit rate is accurate to 1%. As a result the burst length is typically 1 ms, giving Delta a minimum value of 2 ms.

The difference in repetition period between any two transmitters must also be small enough such that if the data packets from two handsets collide once, they will not collide again until the data packet has changed. This results in the following constraint:

$(N-1)*$(Period N)+$2*$(burst length)$\leq N*$Period 1 where N is the number of transmitters (in this case four).

To maximise data rate and minimise delay, the repetition periods should be as short as possible. Combining the above constraints gives the following optimum relationship between the burst length and the repetition period:

Period $n=2*$(burst length)$*[(N-1)^2+n]$.

So the optimum repetition periods for the four transmitter system of FIG. 1 are:

Period 1=20*burst length=20 ms

Period 2=22*burst length=22 ms

Period 3=24*burst length=24 ms

Period 4=26*burst length=26 ms

As the repetition period is proportional to the data packet length, the data packet length can be chosen to suit the delay requirements of the system without affecting the overall data capacity.

The handset with the longest repetition period transmits data at a lower rate than the handset with the shortest repetition period. However the players will rarely press the buttons 18 quickly enough to generate a continuous series of data packets. Therefore the difference in data rates is generally not a problem. However if the differing data rates become a problem, then the system can be adapted to transmit more bits in the less frequent data packets. For instance the four handsets 25–28 could transmit data packets containing 80,88,94 and 102 bits respectively.

In an alternative embodiment, the microprocessor 35, oscillator 39, transmit time slot counter 41 and time stamp counter 42 are replaced by a dedicated IC (not shown) which performs the same functions.

We claim:

1. A method of inputting one or more items of information to a data destination, the method comprising: generating the item(s) of information at one or more data sources; transmitting the item of information to the data destination in a data packet; calculating a time stamp value in accordance with the time delay between generating the item of information and transmitting the data packet; encoding the time stamp value in the data packet; decoding the data packet at the data destination to retrieve the time stamp value; and calculating the time delay associated with the data packet in accordance with the retrieved time stamp value.

2. A method according to claim 1 wherein a plurality of items of information are input to the data destination from a plurality of data sources.

3. A method according to claim 1 further comprising calculating the order of generation of the items of information in accordance with the time stamp value associated with the retrieved time stamp values.

4. A method of inputting a plurality of items of information to a data destination, the method comprising: generating the items of information at one or more data sources; transmitting each item of information from each data source as a series of data packets, each data packet being separated from adjacent data packets transmitted by the same data source by a repetition period, the repetition period of each data source being different from the repetition periods of the other data sources; repeatedly transmitting each item of information from the same data source in at least N adjacent data packets, where N is the number of data sources, in order to ensure that at least one of the N adjacent data packets is received at the data destination without overlapping with data packets from the other data sources; calculating a time stamp value in accordance with the time delay between generating an item of information and transmitting the data packet; encoding the time stamp value in the data packet; decoding the data packet at the data destination to retrieve the time stamp value; and calculating the time delay associated with the data packet in accordance with the retrieved time stamp value.

5. A method according to claim 1 wherein the item(s) of data comprise(s) game-play data, the data source(s) comprise(s) one or more game-play input devices which generate the game-play data, and the data destination comprises a game-play controller.

6. A system comprising: a data destination having a receiver for receiving data; one or more data sources each comprising means for generating an item of information; a transmitter for transmitting the item of information to the data destination; a processor for controlling the transmitter such that the transmitter transmits the item of information to the data destination in a data packet; means for calculating a time stamp value in accordance with the time delay between generating the item of information and transmitting the data packet; an encoder for encoding the time stamp value in the data packet; and the data destination further comprising a decoder for decoding the data packet to retrieve the time stamp value and means for calculating the time delay associated with the data packet in accordance with the retrieved time stamp value.

7. A system according to claim 6 wherein the means for calculating a time stamp value comprises a time stamp counter which counts at a predetermined rate during the time delay to generate a count value.

8. A system comprising: a data destination having a receiver for receiving data; one or more data sources each comprising means for generating an item of information, the data destination being unable to transmit synchronization information to the data source(s), and the data source(s) being unable to receive synchronization information from the data destination; a transmitter for transmitting the item of information to the data destination; a processor for controlling the transmitter such that the transmitter transmits the item of information to the data destination in a data packet; means for calculating a time stamp value in accordance with the time delay between generating the item of information and transmitting the data packet; an encoder for encoding the time stamp value in the data packet; a decoder at the data destination for decoding the data packet to retrieve the time stamp value; and means for calculating the time delay associated with the data packet in accordance with the retrieved time stamp value.

9. An interactive game-play system comprising a communication system according to claim 6, wherein the data destination comprises a game-play system controller, the data source(s) comprise(s) one or more game-play input devices, and the item(s) of data comprise(s) one or more items of game-play data generated by the game-play input device(s).

* * * * *